May 2, 1933.  C. F. KLAGES ET AL  1,907,297
MULTIPLE GLASS CUTTING MACHINE
Filed Aug. 24, 1925   2 Sheets-Sheet 1
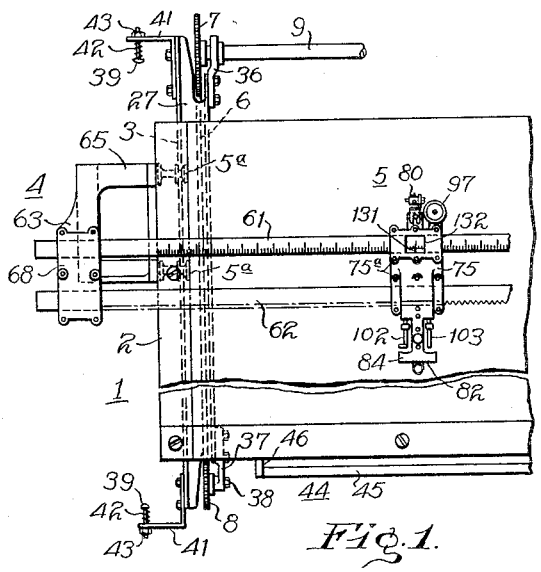
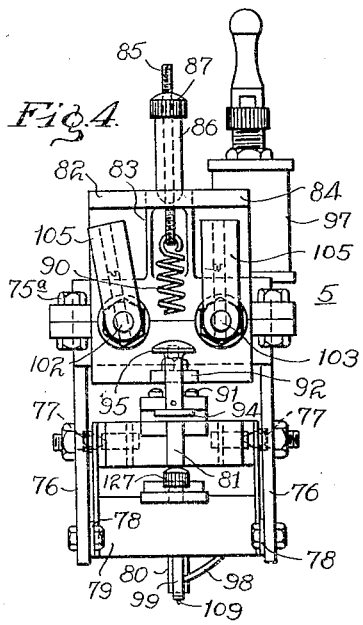
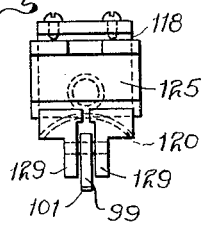
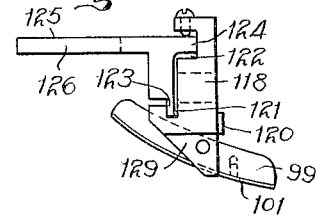
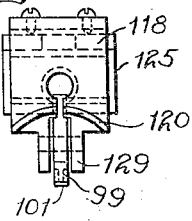
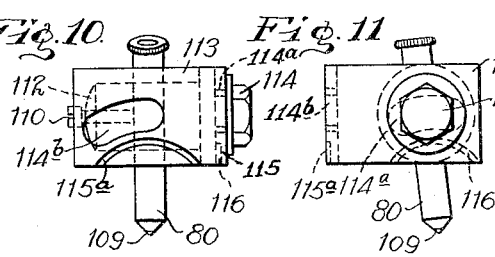
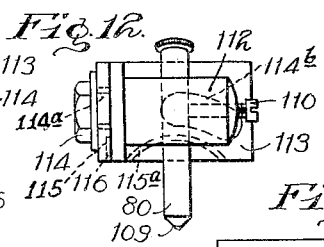
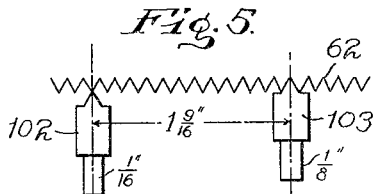
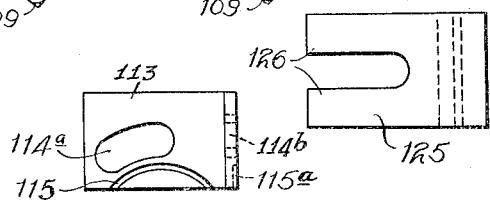
INVENTOR
Chester F. Klages
Norman H. Klages
BY H. C. Lowe May 2, 1933.  C. F. KLAGES ET AL  1,907,297
MULTIPLE GLASS CUTTING MACHINE
Filed Aug. 24, 1925   2 Sheets-Sheet 2
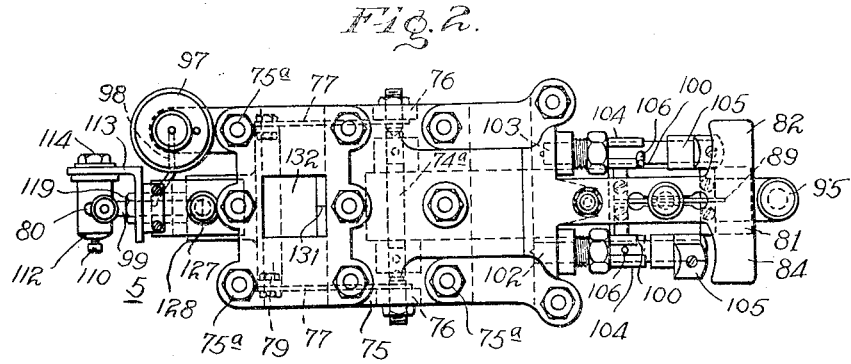
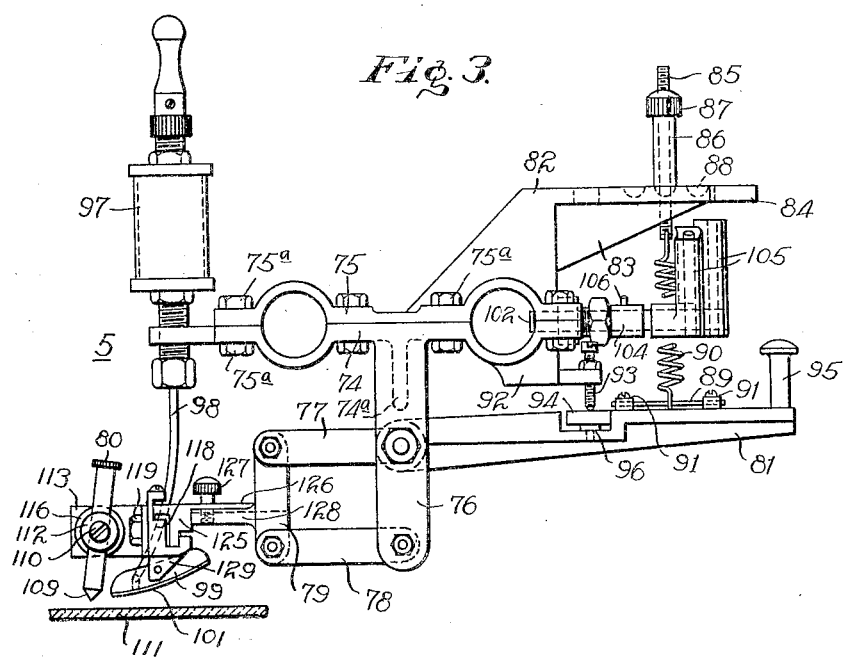
WITNESSES:
INVENTOR
Chester F. Klages &
Norman H. Klages
BY H. C. Lowe Patented May 2, 1933

1,907,297

UNITED STATES PATENT OFFICE

CHESTER F. KLAGES AND NORMAN H. KLAGES, OF PITTSBURGH, PENNSYLVANIA, ASSIGNORS TO G. W. KLAGES AND SON, INCORPORATED, OF PITTSBURGH, PENNSYLVANIA, A CORPORATION OF PENNSYLVANIA

MULTIPLE GLASS CUTTING MACHINE

Original application filed August 24, 1925, Serial No. 52,098. Divided and this application filed April 3, 1929. Serial No. 352,212.

This application is a division of our application Serial No. 52,098 filed August 24, 1925, resulting in Patent No. 1,852,310, granted Apr. 5, 1932, and relates to an improvement in multiple glass cutting machines and has particular relation to the cutter for holding the diamond cutting tool.

One object of our invention is to provide means for quickly positioning a plurality of cutters upon a measuring bar that constitutes part of the carriage.

Another object of our invention is to provide apparatus for adjusting a diamond holder, whereby the diamond is certain to be in the same position with respect to a cutter in which it is to be mounted as a diamond holder that has been previously removed from the cutters.

Still another object of our invention is to provide a multiple glass cutting machine which will be relatively simple and economical of construction and positive and reliable in operation.

Briefly speaking, our invention comprises providing an improved cutter for yieldingly holding a diamond, whereby the cutter may be quickly positioned upon the carriage and the diamond may be quickly replaced by another diamond.

For a better understanding of our invention reference may be made to the accompanying drawings.

Figure 1 is a plan view of a multiple glass cutting machine (only a portion illustrated) constructed in accordance with our invention.

Figs. 2, 3 and 4 are views, in plan, side and end elevation respectively, of one of the cutters illustrated in Fig. 1 of the drawings.

Fig. 5 is a diagrammatic view of the spacing device employed for positioning a cutter quickly upon the carriage.

Figs. 6 to 9 inclusive, are detail views of a holder for a bumping block and the means for effecting horizontal adjustment of the members that hold the diamond or cutting tool.

Figs. 10 to 13, inclusive, are detail views of a double swivel device for holding the diamond or cutting tool.

Referring particularly to Fig. 1 of the drawings a table 1 (only a portion of which is illustrated), having a wooden top 2, is provided with a plurality of rails 3 on which is movably mounted a carriage 4. The carriage 4 is provided with a plurality of rollers 5—a which engage the rails 3. A plurality of cutters 5 (only 1 illustrated) are slidably mounted upon the carriage 4.

The movement of the carriage 4 is governed by a plurality of chains 6 which are secured to said carriage and are mounted upon a plurality of sprocket wheels 7 and 8. The pair of sprocket wheels 7 are rigidly secured to a shaft 9 so the wheels 7 will rotate at the same speed.

A plurality of resiliently mounted pins 39 are employed for stopping the carriage 4 when it arrives at either end of the rails 3.

Referring again to the carriage 4, it comprises two horizontal rods or bars 61 and 62, which are mounted in a plurality of brackets 63 and 64. The bracket 63 is so provided with a horizontal off set 65, that ample clearance is provided between the bracket 63 and the left side of the table 1. The purpose of this shape of bracket 63 is to permit the ragged edge of a sheet of glass to project over the left of the table 1.

The rod 61 is graduated in feet and inches, so that the cutters 5 may be positioned thereon as desired by the operator. The rod 62 is provided with a plurality of teeth (8 to the inch) to definitely position the cutters 5 in a manner hereinafter more fully described.

Each of the cutters 5 comprises two body members 74 and 75, which are adapted to fit around the rods 61 and 62 of the carriage 4 upon which the cutters 5 are slidably mounted and they are securely fastened one to another by a plurality of bolts 75a.

The lower body portion 74 of the cutter 5 is provided with two downwardly projecting bars 76, which are adapted to support a plurality of levers 77 and 78 which are pivotally mounted thereon. The levers 77 and 78 are pivotally connected to a holding device 79 for a cutting tool 80, a description of which will be hereinafter more fully given.

The lever 77 is provided with a horizontal flange 81 at the opposite end from the cutting tool 80. The upper portion 75 of the cutter 5 is provided with a horizontal flange or projection 82, which is reinforced by a V-shaped vertical projection or brace 83. A handle 84 forms part of the flange 82 of the cutter 5.

A resilient member or spring 90 is fastened to a threaded rod 85 upon which is mounted a sleeve 86 and an adjusting nut 87. The sleeve 86 may be positioned in any one of a plurality of sockets 88 in the horizontal flange 82. The other end of the spring 90 is fastened to a relatively small bar 89 which is secured to the lever 77 by means of bolts 91. This method of mounting the spring 90 permits the tension therein to be adjusted by moving the sleeve 86 to various sockets 88 in the flange 82.

The body portion 74 of the cutter 5 is provided with a lug 92 in which is positioned a screw 93 for adjustably limiting the upward movement of the lever 77. A plate 94 which is slidably mounted in the horizontal flange 81 of the lever 77, is employed for locking the cutting tool 80 in an inoperative position. The plate 94 may be actuated by the handle 95 which is secured to one end thereof.

When the plate 94 occupies the position, illustrated in Fig. 3 of the drawings, then the cutting tool 80 is raised from the surface of the glass 111. When the plate 94 is drawn outwardly, then an adjustable bolt 96 engages the screw 93 and permits the cutting tool 80 to engage the sheet of glass 111.

An oil cup 97 is securely mounted on the lower body portion 74 of the cutter 5. A pipe 98 extends from the oil cup 97 to a pivotally mounted bumper 99 which is provided with an oil pad 101 on its under surface.

The cutter 5 is provided with a plurality of plungers 102 and 103 for engaging the teeth of the horizontal bar or rack member 62 of the carriage 4. The plungers 102 and 103 are mounted in threaded sleeves 104 and each is provided with a handle 105. A pin 106 is provided in each of the plungers 102 and 103 for locking them in an inoperative position when desired. This locking is effected by providing a slot in each of the sleeves 104 in which the pin 106 lies, when the pin 106 occupies its locking or operative position.

An offset 100 is provided in each of the sleeves 104 in which the corresponding pin 106 lies when the plunger 102 or 103 occupies its unlocked or inoperative position. The plungers 102 and 103 are spaced apart a distance of one and nine sixteenths inches. When it is desired to set the cutter 5 at some one of the eighth divisions on the carriage 4, the plunger 103 is employed to lock the cutter 5 in position. The other plunger 102 is employed for setting the cutter 5 in any one of the sixteenth positions on the scale of the carriage 4. The manner in which this is effected is best illustrated by Fig. 5 of the drawings, which is a diagrammatic view of the horizontal rod 62 and the plungers 102 and 103. It is readily apparent that the point of the plunger 102 can not fit in the indentation between the teeth of the bar 62, when the plunger 103 occupies its operative position as illustrated in the drawings. It is equally apparent that the plunger 103 can not occupy its operative position between the teeth of the rod 62 at the same time the plunger 102 occupies its operating position between the teeth of the rod 62.

By this arrangement of plungers or locking devices, it is possible for the operator to set quickly the reference mark 131 provided adjacent to the hole in the upper body portion 75 of the cutter 5 on any division of the scale on the rod 61 of the carriage 4. This reference mark 131 is positioned in a predetermined relation to the plungers 102 and 103 of the cutter 5.

The cutting tool 80 is provided with a diamond 109 at its lower edge for cutting a sheet of glass 111 (see Figs. 3, 10 to 13 inclusive). The cutting tool 80 is slidably positioned in a small shaft 112 by means of a screw 110. The shaft 112 is mounted in a bent plate 113 by means of a screw bolt 114 which extends through an arcuate slot 114a. In addition to a slot 114a for the bolt 114, an arcuate-shaped groove 115 is provided in the bent plate 113 and a corresponding arcuate projection 116 is provided in the flared end of the shaft 112.

The effect of the projection 116 of the shaft 112 slidably fitting in the groove 115 of the bent plate 113 is to maintain the diamond 109 of the cutting tool 80 in the same stationary position, as the upper portion of the tool 80 is actuated through the arc of a circle. The plate 113 is mounted in a rigid member 118 by means of a threaded bolt 119 which passes through a slot 114b in the plate 113. The rigid member 118 is provided with an arcuate projection 120 which is adapted to fit in a corresponding groove 115a in the bent plate 113.

This groove arrangement permits the bent plate 113 to be actuated thereby adjusting the angle of inclination of the cutting tool 80 without changing the distance of the diamond 109 from its position with respect to the cutter 5.

The rigid member 118 is provided with two relatively deep grooves 121 and 122 (Fig. 7) in which corresponding projections 123 and 124 of a rigid member 125 are slidably mounted. This arrangement permits of horizontal adjustment of the relative position of the rigid members 118 and the diamond 109 with the rigid member 125. The rigid member 125 is provided with two outwardly projecting arms 126, which are adapted to slidingly fit upon a bolt 127, which is mounted upon a horizontal projection 128 of the rigid member 79.

The rigid member 118 is provided with two flange projections 129 between which the bumping block 99 is pivotally mounted.

The operation of our invention is as follows:—

The cutters 5 are set in predetermined position upon the rods 61 and 62 of the carriage 4. Each of the cutters 5 is positioned to the nearest sixteenth of an inch by means of the plunger 102 or to the nearest eighth of an inch by means of the plunger 103. The diamond 109 in the cutting tool 80 has already been adjusted to a predetermined position with relation to the reference mark on the cutter 5. In case it is desired to render one of the cutters 5 inoperative, the diamond 109 is locked in its inoperative position by means of the plate 94, being actuated inwardly to the position illustrated by Figure 3 of the drawings.

The carriage 4 is then actuated to the rear of the table 1 and a sheet of glass is then placed upon the wooden top 2 thereof.

The carriage 4 is then drawn at a moderate speed toward the operator. When the bumping block 99 comes in contact with the edge of the sheet of glass 111, the block 99 is forced upwardly thereby raising the cutting tool 80 which holds the diamond 109. This upward movement of the cutting tool 80 does not change the angle of inclination of the cutting tool 80 with the sheet of glass 111. The reason that this angle remains the same is that the levers or rigid members 77 and 78 are always parallel one to another and the rigid member 79 is always parallel with the vertical bar 76.

The method of readjusting a diamond 109, when one of its edges becomes worn, is to unfasten the rigid member 125 from the rigid member 79. This is accomplished by releasing the screw 127. The mounting for another diamond 109, including the rigid member 125 is immediately placed upon the rigid member 79 by the operator and the screw 127 is tightened.

The diamond 109 and the device for holding it which has been removed from the cutter 5, is then taken to an adjustor who remounts it in the cutting tool 80 or readjusts the cutting tool 80 with respect to the grooved member 118. The adjustor has a single cutter 5 in which he may make trial adjustments of the cutting tool 80. The object of this operation is to bring the diamond 109 in a predetermined relation with the reference mark 131 on the cutter 5. This method of adjustment of the cutting tool 80 makes it possible to keep the table 1 in operation without loss of time due to the replacing of diamonds. The readjusting of the diamond 109 is a slow piece of work and therefore a great saving of time is effected.

While we have shown our invention in its preferred form, it is apparent that minor modifications may be made in the construction of the table without departing from the spirit of our invention. We desire, therefore, to be limited only by the scope of the appended claims.

We claim:

1. In a glass cutting machine, the combination with a table, of a reciprocable carriage mounted thereon, a rack member carried by said carriage and having a plurality of teeth, a cutter carried by said carriage and adapted to move relative to said rack member, and a plurality of plungers mounted in said cutter for engaging said teeth, said plungers being separated from each other by a distance divisible by the width of one tooth with a remaining distance of a fraction of the width of a tooth.

2. In a glass cutting machine, the combination with a table, of a carriage mounted thereon, a pair of horizontally extending rods, carried by said carriage, one of said rods having a plurality of uniformly spaced teeth, a cutter slidably supported on said rods and adapted to move relative to said teeth, and a pair of plungers mounted in said cutter for engaging said teeth, said plungers being spaced longitudinally of said teeth such a distance that only one of the plungers is operative at one time.

3. In a glass cutting machine, the combination with a table, of a carriage movably mounted thereon, a rack member carried by said carriage and having a plurality of uniformly spaced teeth, a cutter carried by said member and adapted to move along said member, a plurality of plungers resiliently mounted in said cutter for engaging said teeth, each of said plungers having an operative and an inoperative position and so spaced that but one plunger can occupy its operative position by fitting in said teeth at one time and means for locking each of said plungers in an inoperative position.

4. In a glass cutting machine, the combination with a table, of a carriage movably mounted thereon, a rack member mounted upon said carriage and having a plurality of teeth, a cutter slidably supported on said member, and a plurality of longitudinally spaced plungers carried by said cutter and movable into position to engage the teeth of said rack member, said plungers being spaced apart such distance that only one plunger can fully enter between said teeth at one time.

5. In a glass cutting machine, the combination with a table, of a carriage mounted thereon, a rack member mounted upon said carriage and having a plurality of uniformly spaced teeth, a cutter slidably mounted upon said member, a plurality of plungers resiliently mounted within said cutter for engaging said teeth, said plungers being so spaced that only one plunger can fully occupy its operative position between said teeth at one time, and means for individually locking said plungers in an inoperative position.

6. In a glass cutting machine, the combination with a table, of a carriage movably mounted on said table, a cutter mounted upon said carriage and movable in a direction longitudinal to said carriage and transverse to the direction of movement of the carriage, means comprising a reference mark on said cutter and graduations on said carriage for indicating the longitudinal position of said cutter on said carriage, a cutting tool, and detachable means comprising two relatively movable members for securing said tool to said cutter, said relatively movable members being capable of adjustment one to another while removed from said cutter so as to bring said tool in predetermined longitudinal relation to said reference mark on said cutter and to said carriage upon being reattached to said cutter.

7. In a glass cutting machine, the combination with a table, of a reciprocable carriage mounted thereon, a cutter mounted upon said cariage and adjustable transversely thereof, means comprising a reference mark on said cutter for indicating the position of said cutter on said carriage, a cutting tool, and detachable means for securing said tool to said cutter comprising a plurality of horizontally adjustable interlocking members for mounting said tool in predetermined transverse relation with said reference mark on said cutter, said interlocking members being capable of horizontal adjustment though removed from said cutter.

8. In a glass cutting machine, the combination with a table, of a reciprocable carriage mounted thereon, a cutter movably mounted upon said carriage, a cutting tool, a holding device for said tool, a member detachably mounted on said cutter, and a slidably interlocking connection between said device and said member to permit lateral adjustment of said holding device with reference to said cutter, said member being capable of lateral adjustment with respect to said device while removed from said cutter.

9. In a glass cutting machine, the combination with a table, of a carriage movably mounted on said table, a cutter mounted on said carriage and adjustable transversely thereof, means comprising a reference mark on said cutter and graduations on said carriage for indicating the position of said cutter on said carriage, a diamond, a holder for said diamond, means for changing the angle of inclination of said holder to said table and detachable means for securing said holder to said cutter comprising two relatively movable interlocking members for adjustably positioning said diamond in predetermined lateral relation with said reference mark, said relatively movable members being adjustable while dismounted from said cutter.

10. In a glass cutting machine, the combination with a table, of a carriage movably mounted on said table, a cutter movably mounted on said carriage and adjustable transversely thereof, a diamond, and means comprising two interlocking members for detachably mounting said diamond in a predetermined lateral position on said cutter, said interlocking members also being adjustable transversely of the carriage and independently of said cutter.

In testimony whereof, we have hereunto subscribed our names this 30th day of March, 1929.

CHESTER F. KLAGES.
NORMAN H. KLAGES.